(12) United States Patent
De Stefano et al.

(10) Patent No.: US 10,876,026 B2
(45) Date of Patent: Dec. 29, 2020

(54) WELLBORE FLUIDS AND METHODS OF USE THEREOF

(71) Applicant: M-I L.L.C., Houston, TX (US)

(72) Inventors: Guido De Stefano, Spring, TX (US); Paige Kiesewetter, Houston, TX (US)

(73) Assignee: M-I L.L.C., Houston, TX (US)

( * ) Notice: Subject to any disclaimer, the term of this patent is extended or adjusted under 35 U.S.C. 154(b) by 0 days.

(21) Appl. No.: 15/960,377

(22) Filed: Apr. 23, 2018

(65) Prior Publication Data

US 2018/0320048 A1 Nov. 8, 2018

Related U.S. Application Data

(60) Provisional application No. 62/500,257, filed on May 2, 2017.

(51) Int. Cl.
*E21B 21/00* (2006.01)
*C09K 8/035* (2006.01)
*E21B 33/138* (2006.01)
*C09K 8/34* (2006.01)
*C09K 8/502* (2006.01)

(52) U.S. Cl.
CPC ............. *C09K 8/035* (2013.01); *C09K 8/34* (2013.01); *C09K 8/502* (2013.01); *E21B 21/003* (2013.01); *E21B 33/138* (2013.01)

(58) Field of Classification Search
CPC .......... C09K 8/035; C09K 8/34; C09K 8/502; E21B 21/003; E21B 33/138
See application file for complete search history.

(56) References Cited

U.S. PATENT DOCUMENTS

| | | | | |
|---|---|---|---|---|
| 3,344,063 A | * | 9/1967 | Stratton | C09K 8/203 507/108 |
| 4,246,124 A | * | 1/1981 | Swanson | C09K 8/685 507/211 |
| 4,329,448 A | * | 5/1982 | Cox | A61K 8/73 424/49 |
| 4,500,436 A | * | 2/1985 | Pabley | C09K 8/16 507/106 |
| 4,620,596 A | * | 11/1986 | Mondshine | C09K 8/50 166/292 |
| 4,812,503 A | * | 3/1989 | Baseman | C09D 5/086 523/455 |
| 7,073,585 B2 | * | 7/2006 | Morgan | C04B 40/0039 166/294 |
| 7,222,672 B2 | * | 5/2007 | Blauch | C09K 8/035 166/278 |
| 2003/0191030 A1 | * | 10/2003 | Blair | F17D 1/17 507/225 |
| 2006/0223714 A1 | * | 10/2006 | Svoboda | C09K 8/32 507/203 |
| 2008/0066909 A1 | * | 3/2008 | Hutchins | C09K 8/685 166/280.1 |
| 2009/0247428 A1 | * | 10/2009 | Duncum | C09K 8/12 507/120 |
| 2010/0294501 A1 | * | 11/2010 | Daute | A61K 8/37 166/311 |

* cited by examiner

*Primary Examiner* — Silvana C Runyan

(57) ABSTRACT

A fluid loss control agent may include at least one thinner; and at least one polymeric component. A wellbore fluid may include a base fluid and a fluid loss control agent, which includes at least one thinner and at least one polymeric component. Methods of use are also described.

17 Claims, No Drawings

WELLBORE FLUIDS AND METHODS OF USE THEREOF

CROSS REFERENCE TO RELATED APPLICATIONS

This application claims the benefit of priority to U.S. Provisional Patent Application No. 62/500,257, filed on May 2, 2017, the entire content of which is incorporated herein by reference.

BACKGROUND

During the drilling of a wellbore, various fluids are typically used in the well for a variety of functions. The fluids may be circulated through a drill pipe and drill bit into the wellbore, and then may subsequently flow upward through the wellbore to the surface. During this circulation, a wellbore fluid may act to remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the formation by providing sufficient hydrostatic pressure, to prevent the ingress of formation fluids into the wellbore, to cool and lubricate the drill string and bit, and/or to maximize penetration rate.

For a wellbore fluid to perform these functions and allow drilling or other wellbore operations to continue, the wellbore fluid has to stay in the borehole. Frequently, undesirable formation conditions are encountered in which substantial amounts or, in some cases, all of the wellbore fluid may be lost to the formation. Wellbore fluid can leave the borehole through large or small fissures or fractures in the formation or through a highly porous rock matrix surrounding the borehole. Thus, fluid loss or lost circulation is a recurring problem in wellbore operations, characterized by loss of wellbore fluids into downhole formations. Further, fluids besides "drilling fluids" can potentially be lost, including completion, drill-in, production fluid, etc. Lost circulation can occur naturally in formations that are fractured, highly permeable, porous, cavernous, or vugular. These earth formations can include shale, sands, gravel, shell beds, reef deposits, limestone, dolomite, and chalk, among others.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a fluid loss control agent that includes at least one thinner; and at least one polymeric component.

In another aspect, embodiments disclosed herein relate to a wellbore fluid that includes a base fluid; and a fluid loss control agent that includes at least one thinner; and at least one polymeric component.

In yet another aspect, embodiments disclosed herein relate to a method of reducing fluid loss that includes pumping a wellbore fluid into a wellbore, the wellbore fluid comprising a fluid loss control agent including at least one thinner; and at least one polymeric component.

Other aspects and advantages of the claimed subject matter will be apparent from the following description and the appended claims.

DETAILED DESCRIPTION

Embodiments disclosed herein relate generally to a fluid loss control agent and compositions including the agents and methods of using said agents and compositions. More specifically, embodiments disclosed herein relate to a dry fluid loss control agent that has an advantageous health, safety, and environmental profile, while also having the potential to use unexpectedly less product to achieve effective fluid loss control.

In one or more embodiments, the dry fluid loss control agent includes at least one polymeric component, and at least one thinner. As discussed above, the fluid loss control agent may be in a dry and powder-like state. Upon its addition to a wellbore fluid the fluid loss control agent may evenly disperse in order to treat, prevent, or reduce, fluid loss to the formation. In the fluid loss control agent according to the present disclosure, the polymeric component may cause a thickening/viscosifying effect that may facilitate the development of a plaster-like coating on the formation wall. The thinner in the fluid loss control agent may help to ensure that the polymeric component does not render the fluid in which the fluid loss control agent is dispersed become too thick so as to have unacceptable rheological properties for use in downhole operations. Particulate bridging agent may optionally be included to complement the polymeric component by providing solid particles that may plug and/or bridge over pores within the formation that can be a source of fluid loss.

In one or more embodiments, the polymeric component may be present, relative to the total weight of the polymeric component and the thinner within the fluid loss control agent, at an amount that is at least about 90% by weight, or at least about 92.5% by weight, or at least about 95% by weight, and up to about 98.5% by weight. The relationships between the amount of polymeric component and thinner in the fluid loss control agent that are expressed above may satisfactorily provide suitable rheological properties for using the wellbore fluid that the fluid loss control agent is dispersed into in downhole operations.

In one or more embodiments, the at least one polymeric component may be selected from a styrene acrylate copolymer or a styrene butadiene copolymer; however, in other embodiments, the at least one polymer component may be a latex polymer including polymers or copolymers of vinyl acetate, vinyl esters of fatty acids, acrylic and/or methacrylic acids (or salts and esters thereof), acrylonitrile, styrene, butadiene, vinyl chloride, vinylidene chloride, tetrafluoroethylene and other mono-olefinically unsaturated monomers In one or more embodiments, the polymeric component may be at least about 25% by weight of the fluid loss control agent. In one or more embodiments, the polymeric component may be up to about 50% by weight of the fluid loss control agent, or up to about 45% by weight of the fluid loss control agent, or up to about 40% by weight of the fluid loss control agent, or up to about 35% by weight of the fluid loss control agent, or up to about 30% by weight of the fluid loss control agent.

In accordance with the present disclosure, the thinner may be a polyphenolic such as quebracho. Quebracho is a powdered form of tannic acid extract that is extracted from the heartwood of the Schinopsis trees that grow in Argentina and Paraguay.

In one or more embodiments, the dry thinner may be included in the fluid loss control agent in amounts of up to about 2.5% by weight of the fluid loss control agent, or up to about 2% by weight of the fluid loss control agent, or up to about 1% by weight of the fluid loss control agent, or up to about 0.8% by weight of the fluid loss control agent, or up to about 0.6% by weight of the fluid loss control agent, or up to about 0.4% by weight of the fluid loss control agent.

In one or more embodiments, at least one particulate bridging agent may be optionally used. Bridging materials may be insoluble, sparingly soluble, or slowly soluble in the wellbore fluid. Bridging materials may also have a particular shape and hardness such that they may be malleable, and/or round to non-spherical. Bridging materials may include various organic and inorganic salts, oxides, and the like in various insoluble physical forms, whether crystalline or amorphous, including powder, granules, beads, paste, fibers, and/or the like. The particulate bridging agents of the present disclosure may include inorganic compounds, such as salts and/or oxides. In one or more embodiments, the bridging solids may be carbonates such as calcium carbonates, barium carbonates, and the like. In one or more embodiments, the particulate bridging agent may have a $d_{50}$ between about 1 micron and 20 microns, or between about 1.25 microns and 17.5 microns, or between about 1.5 microns and 15 microns. In one or more embodiments, there may be at least two particulate bridging agents in the fluid loss agent. The two particulate bridging agents may be the same or different types of materials, but the at least two particulate bridging agents have differing $d_{50}$ values so that variably sized and shaped voids in the formation may be plugged more effectively. For example, a first particulate bridging agent may have a $d_{50}$ between about 1 micron and 5 micron, or between about 1.25 micron and 4 micron, or between about 1.5 micron and 3 micron, while a second particulate bridging agent may have a $d_{50}$ between about 6 micron and 15 micron, or between about 7 micron and 14 micron, or between about 8 micron and 13 micron. In one or more embodiments, the total amount of particulate bridging agents in the fluid loss control agent may be at least about 50% by weight of the fluid loss control agent and up to about 85% by weight of the fluid loss control agent, or up to about 72.5% by weight of the fluid loss control agent, or up to about 67.5% by weight of the fluid loss control agent, or up to about 60% by weight of the fluid loss control agent.

In one or more embodiments, all of the components of the fluid loss control agent may be homogenously mixed and otherwise formulated as a single product. In one or more embodiments, the fluid loss control agent is a dry powder. The single fluid loss control agent may be applied to a wellbore fluid as it is being pumped downhole or as a pill (e.g. pre-mixed into a small amount of wellbore fluid) when fluid loss is experienced. In one or more embodiments, the fluid loss control agent may be added to a wellbore fluid to treat fluid loss in amounts of up to about 30.5 pound per barrel (ppb), or up to about 20.5 ppb, or up to about 15 ppb. In one or more embodiments, the fluid loss control agent may be added to a wellbore fluid to treat fluid loss in amounts of at least 5 ppb, or at least 7.5 ppb, or at least 10 ppb.

In one or more embodiments, the fluid loss control agents of the present disclosure may be used in oil-based wellbore fluids. Oil based fluids may include an invert emulsion (water in oil).

As mentioned above, in one or more embodiments, the wellbore fluid may be an invert emulsion. The oil-based/invert emulsion wellbore fluids may include an oleaginous continuous phase, a non-oleaginous discontinuous phase, and one or more additives. The oleaginous fluid may be a liquid and more preferably is a natural or synthetic oil and more preferably the oleaginous fluid is selected from the group including diesel oil; mineral oil; paraffin oil; a synthetic oil, such as hydrogenated and unhydrogenated olefins including poly(alpha-olefins), linear and branch olefins and the like, polydiorganosiloxanes, siloxanes, or organosiloxanes, esters of fatty acids, specifically straight chain, branched and cyclical alkyl ethers of fatty acids, mixtures thereof and similar compounds known to one of skill in the art; and mixtures thereof. The concentration of the oleaginous fluid should be sufficient so that an invert emulsion forms and may be less than about 99% by volume of the invert emulsion. In one embodiment, the amount of oleaginous fluid is from about 30% to about 95% by volume and more preferably about 40% to about 90% by volume of the invert emulsion fluid. The oleaginous fluid, in one embodiment, may include at least 5% by volume of a material selected from the group including esters, ethers, acetals, dialkylcarbonates, hydrocarbons, and combinations thereof.

The non-oleaginous fluid used in the formulation of the invert emulsion fluid disclosed herein is a liquid and may be an aqueous liquid. In one embodiment, the non-oleaginous liquid may be selected from the group including sea water, a brine containing organic and/or inorganic dissolved salts, liquids containing water-miscible organic compounds and combinations thereof. The amount of the non-oleaginous fluid is typically less than the theoretical limit needed for forming an invert emulsion. Thus, in one embodiment, the amount of non-oleaginous fluid is less that about 70% by volume and preferably from about 1% to about 70% by volume. In another embodiment, the non-oleaginous fluid is preferably from about 5% to about 60% by volume of the invert emulsion fluid.

The fluids of the present application may further contain additional chemicals depending upon the end use of the fluid so long as they do not interfere with the functionality of the fluids (particularly the emulsion when using invert emulsion fluids) described herein. For example, weighting agents, wetting agents, organophilic clays, emulsifiers, viscosifiers, fluid loss control agents, surfactants, dispersants, interfacial tension reducers, pH buffers, mutual solvents, thinners, thinning agents and cleaning agents may be added to the fluid compositions of this invention for additional functional properties.

In one or more embodiments, a portion of the density may be based on the brine in the non-oleaginous phase; however, it is also envisioned that a solid weighting agent may also be used. The quantity and nature of the solid weighting agent may depend upon the desired density and viscosity of the final composition. Example weighting agents include, but are not limited to, barite, calcite, mullite, gallena, manganese oxides, iron oxides, mixtures of these and the like. The weighting agents may be added in order to obtain a drilling fluid density of less than about 24, 21, or less than about 19.5 pounds per gallon.

Surfactants and wetting agents that may be suitable for use in the wellbore fluid include crude tall oil, oxidized crude tall oil, surfactants, organic phosphate esters, modified imidazolines and amidoamines, alkyl aromatic sulfates and sulfonates, and the like, and combinations or derivatives of these. However, when used with an invert emulsion fluid, the use of fatty acid wetting agents should be minimized so as to not adversely affect the reversibility of the invert emulsion disclosed herein. Faze-Wet™, VersaCoat™, SureWet™, SureMul™, Versawet™ and Versawet™ NS are examples of commercially available surfactants and wetting agents manufactured and distributed by M-I L.L.C. that may be used in the fluids disclosed herein. Silwet L-77, L-7001, L7605, and L-7622 are examples of commercially available surfactants and wetting agents manufactured and distributed by General Electric Company (Wilton, Conn.).

Organophilic clays, normally amine treated clays, may be useful as viscosifiers and/or emulsion stabilizers in the fluid composition of the present invention. Other viscosifiers, such as oil soluble polymers, polyamide resins, polycarboxylic acids and soaps can also be used. The amount of viscosifier used in the composition can vary upon the end use of the composition. However, normally about 0.1% to 6% by weight range is sufficient for most applications. VG-69™ and VG-PLUS™ are organoclay materials distributed by M-I, L.L.C., Houston, Tex., and Versa-HRP™ is a polyamide resin material manufactured and distributed by M-I, L.L.C., that may be used in the fluid composition.

The inclusion of cleaning agents in the fluids disclosed herein should be well known to one of skill in the art. A wide variety of synthetic and natural product derived cleaning agents may be used. For example, a common natural product derived cleaning agent is d-limonene.

The method used in preparing wellbore fluids described herein is not critical. For example, conventional methods can be used to prepare the wellbore fluids in a manner analogous to those normally used, to prepare conventional oil-based drilling fluids. In one representative procedure, a desired quantity of oleaginous fluid such as a base oil and a suitable amount of the remaining components are added sequentially with continuous mixing. An invert emulsion of the present disclosure is formed by vigorously agitating, mixing or shearing the oleaginous fluid with a non-oleaginous fluid.

A wellbore fluid according to the invention may be used in a method for drilling a well into a subterranean formation in a manner similar to those wherein conventional wellbore fluids are used. In the process of drilling the well, a wellbore fluid is circulated through the drill pipe, through the bit, and up the annular space between the pipe and the formation or steel casing to the surface. The wellbore fluid performs several different functions, such as cooling the bit, removing drilled cuttings from the bottom of the hole, suspending the cuttings and weighting material when the circulation is interrupted. In addition, the wellbore fluids of the present disclosure may provide filtration control to prevent excessive loss of wellbore fluids into the formation. The term "filtration control," as used herein, refers to any reduction of fluid loss into the formation achieved by use of the wellbore fluids of the present disclosure.

Wellbore fluids of the present disclosure may be emplaced into the wellbore using conventional techniques known in the art. The latex polymers may be added to the drilling, completion, or workover fluid. In some embodiments, if sealing of a particular interval of the wellbore is needed, a solution of the fluid loss control agent may be injected to such an interval, in addition to other intervals such as in a pill. The wellbore fluids described herein may be used in conjunction with any drilling or completion operation.

In particular, the wellbore fluids of the present disclosure may be injected into a work string, flow to bottom of the wellbore, and then out of the work string and into the annulus between the work string and the casing or wellbore. This batch of treatment is typically referred to as a "pill." The pill may be pushed by injection of other wellbore fluids such as completion fluids behind the pill to a position within the wellbore which is immediately above a portion of the formation where fluid loss is suspected. Injection of fluids into the wellbore is then stopped, and fluid loss will then move the pill toward the fluid loss location. Positioning the pill in a manner such as this is often referred to as "spotting" the pill. Injection of such pills is often through coiled tubing or by a process known as "bullheading."

Upon introducing a wellbore fluid of the present disclosure into a borehole, a filtercake may be formed which provides an effective sealing layer on the walls of the borehole preventing undesired invasion of fluid into the formation through which the borehole is drilled. Filtercakes formed from wellbore fluids disclosed herein include multiple latex polymers and may have unexpected properties. Such properties may include increased pressure blockage, reliability of blockage, and increased range of formation pore size that can be blocked. These filtercakes may provide filtration control across temperature ranges up to greater than 400° F.

Where the formation is a low permeability formation such as shales or clays, the filtercakes formed using the wellbore fluids and methods of the present disclosure prevent wellbore fluid and filtrate loss by effectively blocking at least some of the pores of the low permeation formation. This may allow for support of the formation by maintaining sufficient pressure differential between the wellbore fluid column and the pores of the wellbore. Further, the filtercakes formed by wellbore fluids of the present disclosure may effectively seal earthen formations. These filtercakes are stable at elevated temperatures, and may also effectively seal low permeability formations.

Before taking the well into production, filtercake in the producing region may be removed, such as by using a variety of techniques known in the art. For example, filtercakes according to the present disclosure may be removed using a breaker fluid comprising an acidic aqueous solution. Examples of acids that may be used include strong mineral acids, such as hydrochloric acid or sulfuric acid, and organic acids, such as citric acid, lactic acid, malic acid, acetic acid, and formic acid. The breaker fluid may have a pH below 4, or below 3 in another embodiment. In other embodiments, the filter cake may be removed using a breaker liquid comprising a natural polymer degrading enzyme, for example, a carbohydrase. Examples of such enzymes include amylases, pullulanases, and cellulases. In yet other embodiments, the filtercake may be removed using a washing liquid comprising an oxidizing agent, such as sodium hypochlorite.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A fluid loss control agent, comprising:
   at least one polyphenolic thinner;
   at least one polymeric component; and
   at least one particulate bridging agent selected from organic and inorganic salts and/or oxides,
   wherein
      the at least one polymeric component is selected from a group consisting of a styrene acrylate copolymer, a styrene butadiene copolymer, and a latex polymer,
      the latex polymer consists of polymers or copolymers of vinyl acetate, vinyl esters of fatty acids, acrylic and/or methacrylic acids or salts and esters thereof, acrylonitrile, styrene, butadiene, vinyl chloride, vinylidene chloride, and tetrafluoroethylene, the at least one polymeric component is at least about 25% up to about 50% by weight, relative to a first total amount of the fluid loss control agent, the at least one thinner is up to about 2.5% by weight, relative to the first total amount of the fluid loss control agent, the fluid loss control agent is in a dry and powder-like state such that the fluid loss control agent is a dry powder, and the at least one particulate bridging agent has a $d_{50}$ between about 1 micron and 17.5 microns.

2. The fluid loss control agent of claim 1, wherein the at least one polyphenolic thinner comprises quebracho.

3. The fluid loss control agent of claim 1, wherein the at least one polymeric component is present in an amount of at least 90% by weight, relative to a second total amount of the at least one polyphenolic thinner and the at least one polymeric component within the fluid loss control agent.

4. The fluid loss control agent of claim 3, wherein the at least one polymeric component is present in an amount up to about 98.5% by weight, relative to the second total amount of the at least one polyphenolic thinner and the at least one polymeric component within the fluid loss control agent.

5. The fluid loss control agent of claim 1, wherein the polyphenolic thinner is in a powdered form such that the polyphenolic thinner is a dry thinner.

6. The fluid loss control agent of claim 1, wherein the at least one polymeric component is selected from a group consisting of a styrene acrylate copolymer and a styrene butadiene copolymer.

7. The fluid loss control agent of claim 6, wherein the at least one polyphenolic thinner comprises quebracho.

8. The fluid loss control agent of claim 1, wherein the at least one polyphenolic thinner is up to about 0.4% by weight, relative to the first total amount of the fluid loss control agent.

9. The fluid loss control agent of claim 1, wherein the at least one polymeric component is the latex polymer consisting of the polymers or the copolymers selected from a group consisting of vinyl acetate, vinyl esters of fatty acids, acrylic and/or methacrylic acids or salts and esters thereof, acrylonitrile, styrene, butadiene, vinyl chloride, vinylidene chloride, and tetrafluoroethylene.

10. A method of reducing fluid loss, comprising:
pumping an oil-based invert emulsion wellbore fluid into a wellbore, the oil-based invert emulsion wellbore fluid comprising the fluid loss control agent according to claim 1.

11. The method of claim 10, further comprising:
adding the fluid loss control agent to the oil-based invert emulsion wellbore fluid prior to the pumping.

12. The fluid loss control agent of claim 1, wherein the at least one particulate bridging agent has a $d_{50}$ between about 1.25-micron and 17.5 microns.

13. The fluid loss control agent of claim 12, wherein the at least one particulate bridging agent is at least about 50% by weight, relative to the first total amount of the fluid loss control agent.

14. The fluid loss control agent of claim 13, wherein the at least one particulate bridging agent is up to about 72.5% by weight, relative to the first total amount of the fluid loss control agent.

15. An oil-based invert emulsion wellbore fluid, comprising:
an oleaginous continuous phase;
a non-oleaginous discontinuous phase; and
a fluid loss control agent comprising:
at least one polyphenolic thinner; and
at least one polymeric component,
wherein
the at least one polymeric component is selected from a group consisting of a styrene acrylate copolymer, a styrene butadiene copolymer, and a latex polymer,
the latex polymer consists of polymers or copolymers of vinyl acetate, vinyl esters of fatty acids, acrylic and/or methacrylic acids or salts and esters thereof, acrylonitrile, styrene, butadiene, vinyl chloride, vinylidene chloride, and tetrafluoroethylene,
the at least one polymeric component is at least about 25% up to about 50% by weight, relative to a first total amount of the fluid loss control agent,
the at least one thinner is up to about 2.5% by weight, relative to the first total amount of the fluid loss control agent,
the fluid loss control agent is in a dry and powder-like state such that the fluid loss control agent is a dry powder, and
the fluid loss control agent is present in the oil-based invert emulsion wellbore fluid in an amount of at least 10 ppb and up to about 30.5 ppb.

16. The oil-based invert emulsion wellbore fluid of claim 15, wherein an oleaginous fluid of the oleaginous continuous phase comprises natural oil or synthetic oil.

17. The oil-based invert emulsion wellbore fluid of claim 15, wherein the fluid loss control agent is present in the oil-based invert emulsion wellbore fluid in the amount of at least 105-ppb and up to about 20.5 ppb.

* * * * *